(12) United States Patent
Ryu et al.

(10) Patent No.: US 11,964,327 B2
(45) Date of Patent: Apr. 23, 2024

(54) METHOD FOR PREPARING FUNCTIONAL COMPOSITE POWDER AND FUNCTIONAL COMPOSITE POWDER

(71) Applicant: KOREA ADVANCED INSTITUTE OF SCIENCE AND TECHNOLOGY, Daejeon (KR)

(72) Inventors: Ho Jin Ryu, Daejeon (KR); Tae Gyu Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/750,603

(22) Filed: May 23, 2022

(65) Prior Publication Data

US 2023/0013308 A1    Jan. 19, 2023

(30) Foreign Application Priority Data

Jul. 8, 2021   (KR) .......................... 10-2021-0089748

(51) Int. Cl.
| | |
|---|---|
| *B22F 9/04* | (2006.01) |
| *B29C 64/141* | (2017.01) |
| *B33Y 10/00* | (2015.01) |
| *B33Y 70/00* | (2020.01) |

(52) U.S. Cl.
CPC .............. *B22F 9/04* (2013.01); *B29C 64/141* (2017.08); *B22F 2009/045* (2013.01); *B33Y 10/00* (2014.12); *B33Y 70/00* (2014.12)

(58) Field of Classification Search
CPC ................ B22F 9/04; B22F 2009/041; B22F 2009/043; B22F 2009/044; B22F 2009/045; B22F 1/052; B22F 1/065; B22F 1/142; B22F 1/148; B22F 1/16; B22F 1/17
See application file for complete search history.

(56) References Cited

U.S. PATENT DOCUMENTS

| | | | | |
|---|---|---|---|---|
| 2014/0370324 | A1* | 12/2014 | Watanabe | ................ C09D 5/38 427/377 |
| 2019/0194481 | A1* | 6/2019 | Iacob | ................... C09D 11/102 |

FOREIGN PATENT DOCUMENTS

| | | | | |
|---|---|---|---|---|
| KR | 20110010987 A | * | 7/2009 | ............... B22F 9/04 |
| KR | 1020110010987 A | | 2/2011 | |
| KR | 101407710 B1 | | 6/2014 | |
| KR | 102020320 B1 | | 9/2019 | |

OTHER PUBLICATIONS

Office Action filed in Korean Application No. 10-2021-0089748, dated Apr. 20, 2022, 5 pages.

* cited by examiner

*Primary Examiner* — Ricardo D Morales
(74) *Attorney, Agent, or Firm* — Meunier Carlin & Curfman LLC

(57) ABSTRACT

The present disclosure relates to a method for preparing a functional composite powder and a functional composite powder, and more particularly, to a method for preparing a functional composite powder, the method including the steps of: preparing a metal material powder and an implantation material; adding the metal material powder and the implantation material into a mixer; and forming a functional composite powder by applying kinetic energy to the metal material powder and the implantation material in the mixer, and a functional composite powder prepared by the method.

9 Claims, 5 Drawing Sheets

(a)

(b)

(c)

(a)

(b)

(c)

METHOD FOR PREPARING FUNCTIONAL COMPOSITE POWDER AND FUNCTIONAL COMPOSITE POWDER

CROSS-REFERENCE TO RELATED APPLICATION

This application claims the benefit of Korean Patent Application No. 10-2021-0089748 filed on Jul. 8, 2021, in the Korean Intellectual Property Office, the entire disclosure of which is incorporated herein by reference for all purposes.

BACKGROUND

1. Field of the Invention

The present disclosure relates to a method for preparing a functional composite powder applicable as a metal 3D printing material, and a functional composite powder prepared by the method.

2. Description of the Related Art

With the advent of metal 3D printing technology, the growth of the metal powder market and the demand for alloy powder are increasing. Metal 3D printing is a raw material-dependent technology, and there is a trend of explosively increasing the demand for functional special powders that can be used in metal 3D printing technology rather than conventional alloy powder produced by existing technology.

Metal 3D printing is a technology that has the strength of diversified small-quantity production, and various powders must be supplied smoothly in order to fully utilize this strength, but the variety of raw material powders is insufficient at present. Currently, commercial composite powder as a raw material for metal 3D printing does not exist, or powder that can precisely control the composition is also non-existent. In particular, research is being conducted on a technology for loading a target material on a metal powder as a metal 3D printing raw material or a technology for spheroidization, but the preparation process is complicated, expensive equipment is required, or there are technical difficulties in securing the physical properties and quality that can be actually applied to the metal 3D printing process. That is, a method of dispersing and coating carbon nanotubes on the surface of a spherical powder through chemical vapor deposition (CVD) using a fluidized bed (Liu, Yu, et al. "Planting carbon nanotubes within Ti-6Al-4V to make high-quality composite powders for 3D printing high-performance Ti-6Al-4V matrix composites." Scripta Materialia 183 (2020): 6-11) has been reported, but an expensive complex process CVD coating is used, it is difficult to control the content of the material, and the range of materials applicable to the CVD process is limited. Further, a method of producing a non-spherical alloy powder through mechanical alloying and then producing a spherical 3D printing powder through a plasma spheroidization process has been reported, but the process is complicated and the materials applicable to plasma technology are limited by the thermal stability or the like of the material.

SUMMARY

In order to solve the above-mentioned problems, the present disclosure is to provide a method for preparing a functional composite powder, which may improve the efficiency of the process and expand the range of applicable metal materials and implantation materials compared to a process of using conventional chemical vapor deposition, plasma spheroidization, etc. by implementing the loading of a functional implantation material on the metal material powder through the momentum control of the powder particles, the spheroidization of the metal material powder shape, or both thereof.

The present disclosure is to provide a functional composite powder which may be used as a material for next-generation metal 3D printing being coated or dispersed with various functional implantation materials and having spherical shape, may secure the dispersibility of powder particles and minimize the loss of the implantation materials, and may control the microstructure, composition, physical properties and/or performance of an 3D printed object (or a product) by composite techniques.

The present disclosure is to provide a metal 3D printing method using a functional composite powder for metal 3D printing according to the present disclosure.

The present disclosure is to provide a product metal-3D printed with the functional composite powder for metal 3D printing according to the present disclosure.

However, the problems to be solved by the present disclosure are not limited to those mentioned above, and other problems not mentioned will be clearly understood by those with ordinary skills in the art from the description below.

An aspect of the present disclosure relates to a method for preparing a functional composite powder, the method includes the steps of: preparing a metal material powder and an implantation material; adding the metal material powder and the implantation material into a mixer; and forming a functional composite powder by applying kinetic energy to the metal material powder and the implantation material in the mixer.

According to an example embodiment of the present disclosure, the step of forming the functional composite powder may be controlling the momentum of the metal material powder and implantation material particles by applying the kinetic energy calculated in Equation 1 below.

$$E_{50\%} < \frac{14}{23}\left(\frac{D}{2}\right)^3 \cdot \rho \cdot v_{rms}2 \qquad \text{[Equation 1]}$$

(where, $v_{rms}$ is the speed of the metal material powder, $\rho$ is the density of the metal material, D is the size of the metal material, and $E_{50\%}$ is the energy required for deformation of the implantation material.)

According to an example embodiment of the present disclosure, $E_{50\%}$ in Equation 1 above may be calculated by Equation 2 below.

$$E_{50\%} = \alpha\left(\frac{d}{2}\right)^\beta \qquad \text{[Equation 2]}$$

(where, $\alpha$ and $\beta$ are each a factor governed by the properties and shape of the implantation material, and d is the size of the implantation material.)

According to an example embodiment of the present disclosure, the step of forming the functional composite powder may be controlling the momentum of the metal material powder and the implantation material particles by applying a rotational force, vibration, or both thereof corresponding to the kinetic energy according to Equation 1 above.

According to an example embodiment of the present disclosure, the step of forming the functional composite powder may be forming a spherical functional composite powder having an implantation material layer formed on the metal material particles, or spheroidizing the metal material particles and forming a spherical functional composite powder in which the implantation material layer is formed on the spheroidized metal material particles.

According to an example embodiment of the present disclosure, the metal material may include a powder including at least one of a metal, an alloy, and an intermetallic compound.

According to an example embodiment of the present disclosure, the metal may include at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf, and the alloy may include at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf.

According to an example embodiment of the present disclosure, the implantation material may include materials the same as or different from the metal material powder, and the implantation material may include particles having a size smaller than that of the metal material powder.

According to an example embodiment of the present disclosure, the implantation material may include a metallic material, a non-metallic material, or both thereof, and the implantation material may include at least one selected from the group consisting of a metal, an alloy, a metal matrix composite, an intermetallic compound, a carbon-based material, a nitrogen-based material, a silicon-based material, a MXene-based material, a chalcogenide-based material, an oxide-based material, a boron-based material, a metal salt, a ceramic, and a polymer.

According to an example embodiment of the present disclosure, in the step of adding the metal material powder and the implantation material into the mixer, the implantation material may be added in an amount of more than 0 parts by weight to 100 parts by weight with respect to 100 parts by weight of the metal material powder.

Another aspect of the present disclosure relates to a spherical functional composite powder in which an implantation material layer is formed on metal material particles, the implantation material layer includes a dispersion layer of the implantation material, a shell layer, or both thereof, and the implantation material layer contains a mechanical residual stress.

According to an example embodiment of the present disclosure, the implantation material layer may include a single layer or a plurality of layers, the implantation material layer may have a thickness of 0.01 to 15 μm, and at least a portion of the implantation material layer may penetrate into the metal material particles.

According to an example embodiment of the present disclosure, the functional composite powder may have a size of 10 to 200 μm, the metal material particles may be spheroidized metal material particles, and the surface of the spheroidized metal material particles may be satellite-free.

According to an example embodiment of the present disclosure, the dispersion layer may contain one or two or more types of implantation materials, the dispersion layer may contain an implantation material dispersed and applied on the metal material particles, the shell layer, or both thereof, the dispersion layer may be a single layer or a plurality of layers, and a portion of the dispersion layer may penetrate into the inside of the metal material particles, the shell layer, or both thereof.

According to an example embodiment of the present disclosure, the shell layer may contain an implantation material surrounding the metal material particles, the dispersion layer, or both thereof, the shell layer may be a single layer or a plurality of layers, and the plurality of layers may be the same or may be different in the components, thickness, or both thereof.

According to an example embodiment of the present disclosure, the surface of the shell layer may be satellite-free.

According to an example embodiment of the present disclosure, the shell layer may contain fine grains, and the fine grains may be grains of sub-micrometer unit.

According to an example embodiment of the present disclosure, the shell layer may contain one or two or more types of implantation materials, and the shell layer may contain a first implantation material that is a base material of the shell layer, and may further contain a second implantation material dispersed within the matrix of the first implantation material.

According to an example embodiment of the present disclosure, the implantation material layer may include: a first dispersion layer formed on the metal material particles; and a shell layer surrounding the first dispersion layer, and may further include a second dispersion layer formed on the shell layer, and a portion of the first dispersion layer may penetrate into the inside of the metal material particles.

According to an example embodiment of the present disclosure, the implantation material layer may include: a first shell layer formed on the metal material particles; and a second shell layer which is formed on the first shell layer and surrounds the first shell layer, and may further include a dispersion layer formed on the first shell layer, the second shell layer, or both thereof.

According to an example embodiment of the present disclosure, the carbon-based material may include at least one selected from the group consisting of carbon particles, carbon black, acetylene black, carbon fiber, carbon nanotubes, fullerene, graphene, graphene oxide, reduced graphene, carbide, and activated carbon, and the nitrogen-based material, silicon-based material, MXene-based material, chalcogenide-based material, oxide-based material, and boron-based material may each contain at least one selected from the group consisting of C, Al, Si, Ti, Zr, Ta, Mg, Be, Ba, Zn, Cr, Ce, Y, Sn, W, Hf, V, Nb, Ta, Mo, W, Ta, La, and B.

According to an example embodiment of the present disclosure, the metal salt may include at least one selected from the group consisting of nitrate, sulfate, acetate, acetoacetate, halide, carbonate, carboxylate, perchlorate, cyanide, cyanate, sulfonate, and phosphate.

According to an example embodiment of the present disclosure, the MXene-based material may include at least one of transition metals, and group 13 and group 14 elements.

According to an example embodiment of the present disclosure, the kinetic energy calculated in Equation 1 above may be 1 μJ to 10 mJ.

According to an example embodiment of the present disclosure, the functional composite powder may be for metal 3D printing and may include at least one functional material of metals, alloys, intermetallic compounds, oxides, nucleating materials, and nanoceramic reinforcing materials.

Additional aspects of example embodiments will be set forth in part in the description which follows and, in part, will be apparent from the description, or may be learned by practice of the disclosure.

According to an example embodiment of the present disclosure, the present disclosure may provide a high value-added functional composite powder which may maintain a spherical shape while having the same or different functional coating layers such as reinforcing materials, nucleating materials, etc. through the momentum control of the powder particles, and may be utilized as a 3D printing material.

According to an example embodiment of the present disclosure, the present disclosure may provide a multifunctional powder material that can secure the spherical shape of the metal material powder even when various types of metal materials are added, can expand the material range by enabling the application of organic materials, non-metallic materials such as ceramics, high-melting-point elements such as tungsten, metal powder, etc., i.e., materials which are impossible in the existing CVD process, and can control the physical properties, composition, etc. of the material through the metal 3D printing process.

According to an example embodiment of the present disclosure, the present disclosure may enable the composite techniques in the metal 3D printing process, thereby providing the effect of controlling the properties of the product manufactured by 3D printing, such as mechanical properties, abrasion resistance, an increase in fatigue strength, etc.

BRIEF DESCRIPTION OF THE DRAWING

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of the present disclosure will be described in detail with reference to the accompanying drawings. When it is determined detailed description related to a related known function or configuration they may make the gist of the present disclosure unnecessarily ambiguous in describing the present disclosure, the detailed description will be omitted. Also, terms used in the present specification, as terms used to appropriately describe preferred example embodiments of the present disclosure, may be changed depending on a user, the intent of an operator, a custom of a field to which the present disclosure pertains, or the like. Accordingly, definitions of the present terms should be made based on the contents throughout the present specification. The same reference signs presented in each drawing indicate the same members.

Throughout the specification, when any member is positioned "on" the other member, this not only includes a case that the any member is brought into contact with the other member, but also includes a case that another member exists between two members.

Throughout the specification, if a prescribed part "includes" a prescribed element, this means that another element can be further included instead of excluding another element.

Hereinafter, a method for preparing a functional composite powder of the present disclosure, a functional composite powder, and its utilization will be described in detail with reference to example embodiments and drawings. However, the present disclosure is not limited to such example embodiments and drawings.

The present disclosure relates to a method for preparing a functional composite powder, and according to an example embodiment of the present disclosure, the preparation method may prepare a spherical functional composite powder by coating an implantation material layer on the metal material particles and/or spheroidizing the metal material particles, through the control of the momentum of the powder particles. The preparation method may improve the simplicity and efficiency of the preparation process through simple momentum control without application of heat, plasma, etc., and may impart a material degree of freedom by enabling the application of various materials. Further, the present disclosure may provide a spherical metal material powder of high precision and high-throughput for metal 3D printing, which cannot be produced by the conventional method.

Figure 1:
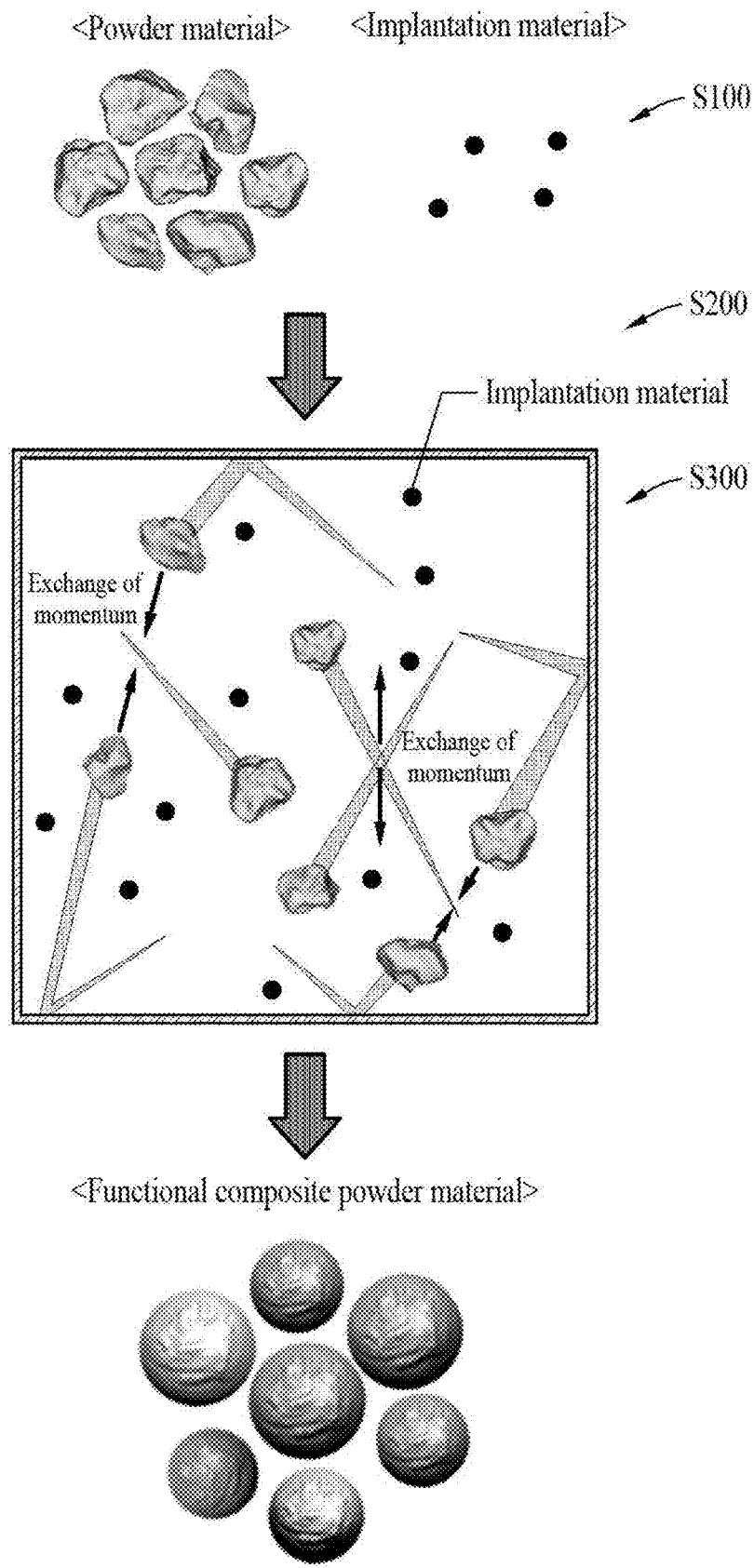
FIG. 1 exemplarily shows a process flow diagram of a method for preparing a functional composite powder according to the present disclosure, according to an example embodiment of the present disclosure.

According to an example embodiment of the present disclosure, referring to FIG. 1, the preparation method may include: a step (S100) of preparing a metal material powder and an implantation material; a step (S200) of adding the metal material powder and the implantation material into a mixer; and a step (S300) of applying kinetic energy to the metal material powder and the implantation material in the mixer to form a functional composite powder.

According to an example embodiment of the present disclosure, in the step (S100) of preparing the metal material powder and the implantation material, the material may be applied without limitation as long as it is a material capable of forming an implantation material layer on the metal material particles through the control of the momentum of the powder particles. The metal material powder may include at least one of a metal (e.g., metal powder) including an alkali metal, an alkaline earth metal, a transition metal, a metalloid, or the like, an alloy, and an intermetallic compound.

As an example of the present disclosure, the metal may include at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf.

As an example of the present disclosure, the alloy may include alloys including at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf. The alloy may contain one or more, two or more, three or more, or four or more types of metals, and may be steel, carbon steel, stainless steel, a metal alloy, or the like.

As an example of the present disclosure, the intermetallic compound may be an intermetallic compound containing at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf.

As an example of the present disclosure, the metal material powder can be applied in various shapes and sizes, the preparation method according to the present disclosure enables a non-spherical, inexpensive powder (e.g., bulk powder) to be applied as the metal material powder, and coating and/or spheroidization of the implantation material may be made by the preparation method according to the present disclosure.

According to an example embodiment of the present disclosure, the implantation material may include materials that are the same as or different from the metal material powder, and for example, may include: metallic materials; non-metallic materials such as organic materials, inorganic materials, ceramics, etc.; or both thereof. For example, the implantation material may be a metal, an alloy, a metal matrix composite, an intermetallic compound, a carbon-based material, a nitrogen-based material, a silicon-based material, a MXene-based material, a chalcogenide-based material, an oxide-based material, a boron-based material, a metal salt, a ceramic, a polymer, or the like. Further, the implantation material, depending on the function, may be classified into functional materials including: surface alloying materials such as a metal, an alloy, and an intermetallic compound; oxides; nucleation seeds; reinforcing materials such as a nanoceramic reinforcing material; etc.

As an example of the present disclosure, the metal, alloy, metal matrix composite, and intermetallic compound each contains at least one selected from the group consisting of Ti, Ta, Se, Sb, Sn, Mg, Mo, Mn, Cr, Zn, Zr, Li, V, Ga, Ge, Fe, Ni, Nb, Cr, Co, Cu, W, Re, Os, Ir, Au, Ag, Pd, Pt, Ru, Rh, U, Th, Pu, Al, and Hf, and this is as mentioned in the above metal material.

As an example of the present disclosure, the carbon-based material may be a carbon-based material or the like having a form of particles, a fiber, a tube, a plate shape, a sheet, a wire, a platelet, or the like, and having the same type of carbon-based material and different types of elements. For example, the carbon-based material may include at least one selected from the group consisting of carbon particles, carbon black, acetylene black, carbon fiber, carbon nanotubes, fullerene, graphene, graphene oxide, reduced graphene, carbide, and activated carbon, but the present disclosure is not limited thereto. For example, the carbide may include at least one selected from the group consisting of B, Al, Si, Ti, Zr, Ta, Mg, Be, Ba, Zn, Cr, Ce, Y, Sn, W, Hf, V, Nb, Ta, Mo, W, Ta, La, and B, but the present disclosure is not limited thereto.

As an example of the present disclosure, the nucleation seed may correspond to a raw material for crystal nucleation and growth of metal or metal compound particles, and for example, may be utilized in the preparation of a functional composite powder for controlling a laminated microstructure. For example, the nucleation seed may include at least one of metal-containing organic materials and inorganic materials, more specifically, at least one selected from the group consisting of: metal carbides; metal salts such as metal coordination compound, nitrate, sulfate, acetate, acetoacetate, halide, carbonate, oxalate, lactate, carboxylate such as stearate or the like, perchlorate, cyanide, cyanate, sulfonate, phosphate, etc.; and metal complexes, and the metal may include transition metals, alkaline earth metals, noble metals, etc., but the present disclosure is not limited thereto.

As an example of the present disclosure, the nitrogen-based material may include a nitride containing at least one selected from the group consisting of C, Al, Si, Ti, Zr, Ta, Mg, Be, Ba, Zn, Cr, Ce, Y, Sn, W, Hf, V, Nb, Ta, Mo, W, Ta, La, and B, but the present disclosure is not limited thereto.

As an example of the present disclosure, the silicon-based material may include a silicide containing at least one selected from the group consisting of C, Al, Si, Ti, Zr, Ta, Mg, Be, Ba, Zn, Cr, Ce, Y, Sn, W, Hf, V, Nb, Ta, Mo, W, Ta, La, and B, but the present disclosure is not limited thereto.

As an example of the present disclosure, the oxide-based material may include an oxide containing at least one selected from the group consisting of C, Al, Si, Ti, Zr, Ta, Mg, Be, Ba, Zn, Cr, Ce, Y, Sn, W, Hf, V, Nb, Ta, Mo, W, Ta, La, and B, but the present disclosure is not limited thereto.

As an example of the present disclosure, the boron-based material may include a boride containing at least one selected from the group consisting of C, N, Al, Si, Ti, Zr, Ta, Mg, Be, Ba, Zn, Cr, Ce, Y, Sn, W, Hf, V, Nb, Ta, Mo, W, Ta, La, and B, but the present disclosure is not limited thereto.

As an example of the present disclosure, the MXene-based material has a two-dimensional planar structure and is a ceramic material represented by $M_2X$, $M_3X_2$, $M_4X_3$, or the like, where M may be selected from transition metals, and group 13 and group 14 elements, and X may be selected from oxygen, carbon, nitrogen, and the like, but the present disclosure is not limited thereto. For example, it may be a hexagonal layered structure type carbide or nitride to which transition metal, carbon, or nitrogen is bonded.

As an example of the present disclosure, the chalcogenide-based material is a compound containing group 16 elements and electropositive elements, for example, a transition metal chalcogenide-based material represented by $MX_2$ (where M is at least one of Mo, W, Ti, Zr, Hf, V, Nb, Ta, Tc, Re, Co, Rh, Ir, Ni, Pd, and Pt, and X is at least one of S, Se, and Te), but the present disclosure is not limited thereto.

As an example of the present disclosure, the implantation material may have a form of particles, a fiber, a tube, a plate shape, a layered shape, a sheet, a wire, a nanoplatelet, a needle, or the like, and may have a two-dimensional structure such as a two-dimensional planar structure or the like, or a three-dimensional structure. The implantation material may include particles having a size smaller than that of the metal material powder. The size of the implantation material may be applicable to micro-size as well as nano-size, and may be selected from 0.1 nm to 10 μm; or 10 nm to 10 μm. For example, when the implantation material is a metallic material, it may include a size of 1 to 30 μm, and when the implantation material is a non-metallic material such as chalcogenide, MXene, ceramic, or the like, it may include a size of 10 nm to 10 μm. The size may mean diameter, thickness, height, length, width, or the like depending on the form of the implantation material.

According to an example embodiment of the present disclosure, in the step (S200) of adding the metal material powder and the implantation material into the mixer, the implantation material may be added in an amount of: more than 0 parts by weight; 0.001 parts by weight or more; more than 0 parts by weight to 100 parts by weight; 0.01 to 70 parts by weight; 0.1 to 60 parts by weight; 1 to 50 parts by weight; or 10 to 30 parts by weight with respect to 100 parts by weight of the metal material powder, and when the amount of the implantation material is included within the above range, it may be advantageous for the formation of a uniform coating layer and functional expression by the implantation material.

According to an example embodiment of the present disclosure, the step (S300) of applying kinetic energy to the metal material powder and the implantation material to form a functional composite powder may apply the kinetic energy calculated according to Equation 1 below to control the momentum of the particles, thereby coating the implantation material on the metal material particles so that a functional composite material may be formed. For example, a spherical functional composite powder in which an implantation material layer is formed on the metal material particles may be formed and/or the metal material particles are spheroidized, and a spherical functional composite powder in which the implantation material layer is formed on the spheroidized metal material particles may be formed.

Figure 2:
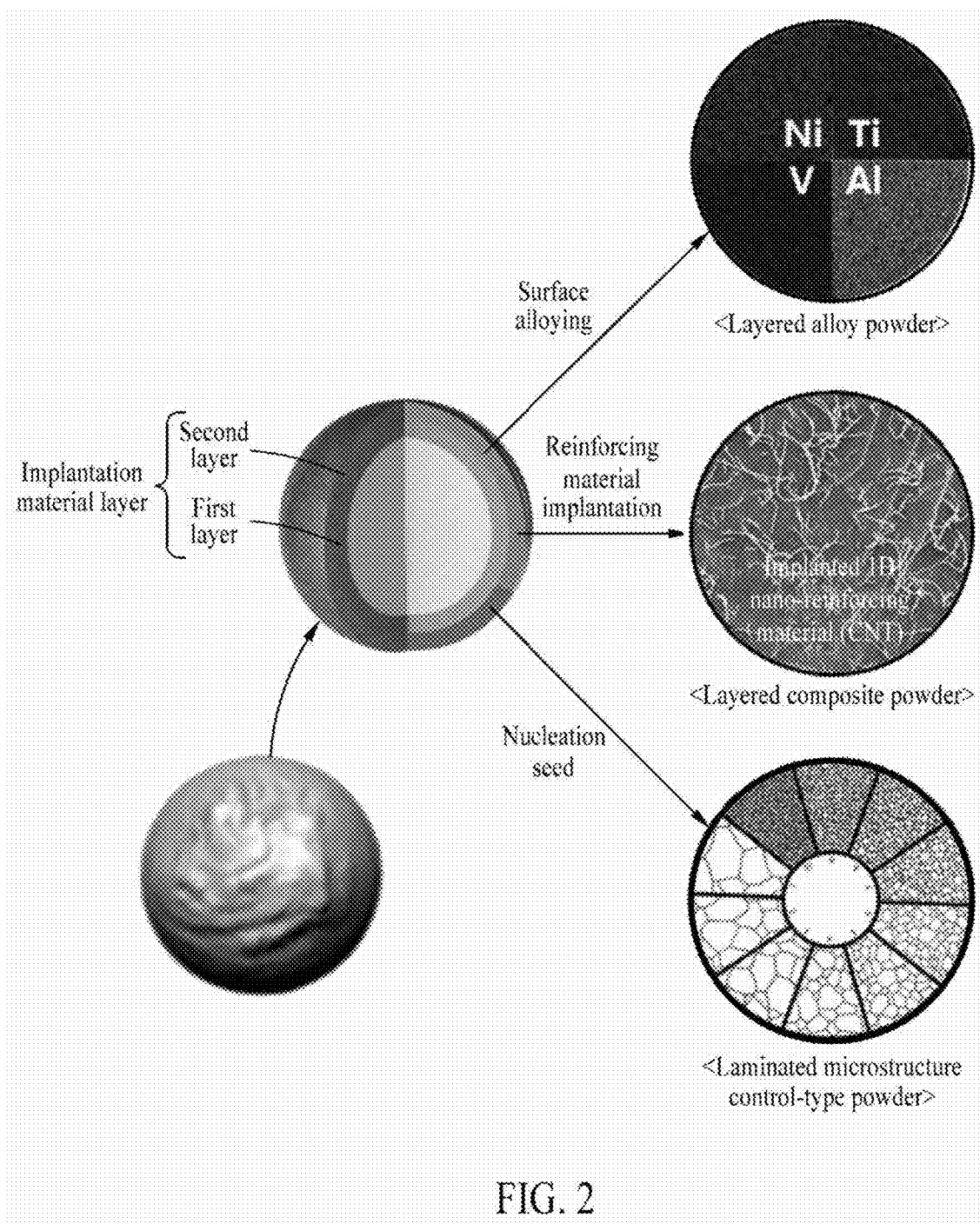
FIG. 2 shows the configuration of the functional composite powder according to the present disclosure, and examples of various implantation materials loaded on the functional composite powder, according to an example embodiment of the present disclosure.

Referring to FIG. 2, the kinetic energy calculated according to the material in Equation 1 below is applied, thereby precisely controlling the powder particle momentum so that the powder surface may be controlled by the collision method, and the coating of the implantation material layer on the metal material powder and/or the spheroidization of the metal material powder may be performed. For example, a spherical functional composite powder having an implantation material layer formed on the metal material particles may be formed, or the metal material particles may be spheroidized, and a spherical functional composite powder having the implantation material layer formed on the spheroidized metal material particles may be formed. There may be provided a powder material for lamination applicable to a process for metal 3D printing through complexing by the implantation material layer and/or spheroidization of the metal material powder. Further, it is possible to apply an inexpensive metal material powder having various shapes other than spherical shape, and uniformly disperse and load the implantation material on the metal material powder. The implantation material may be a component that is the same as or different from the metal material powder, and may be composed of one component or two or more components. The implantation material may be dispersed not only on the particle surface layer of the metal material powder but also on the inside thereof through precise control of the momentum according to Equation 1. Further, a plurality of layers made of different materials may be formed on the surface and/or along the depth direction of the implantation material coating layer by applying various implantation materials. Further, since the implantation material can be dispersed inside the coating layer (that is, the implantation material layer) rather than the surface, it may achieve three-dimensional dispersion rather than two-dimensional dispersion, and improve the anti-aggregation effect and adhesion of the implantation material, thereby lowering the loss rate of the implantation material. Further, it is easy to form a spheroidized functional composite material, and a decrease in flowability due to an increase in the particle surface roughness of the metal material powder is prevented, thereby preventing adhesion between the powders so that the formation of coarse powder may be prevented.

For example, referring to FIG. 2, various materials such as organic materials, inorganic materials, metals, etc. can be applied and a plurality of layers such as the first and second layers is possible by solving the limitation of materials due to the existing process environment such as heat, plasma, moisture, etc. through the momentum control according to Equation 1 below. It is possible to provide a functional composite material such as a composite powder or the like having a microstructure control function by simultaneously providing a starting point for grain production and controlling it during powder metallurgy, casting, and lamination manufacturing through surface alloying, and implantation of nucleation seeds and composite powder implanted with functional materials such as reinforcing materials and the like.

$$E_{50\%} < \frac{14}{23}\left(\frac{D}{2}\right)^3 \cdot \rho \cdot v_{rms}2 \qquad \text{[Equation 1]}$$

In Equation 1, $v_{rms}$ is the speed of the metal material powder, $\rho$ is the density of the metal material, and D is the size of the metal material. $E_{50\%}$ is the energy required for deformation of the implantation material, and calculated by Equation 2.

$$E_{50\%} = \alpha\left(\frac{d}{2}\right)^\beta \qquad \text{[Equation 2]}$$

In Equation 2, $\alpha$ and $\beta$ are factors governed by the properties and shape of the implantation material, and d is the size of the implantation material.

As an example of the present disclosure, the kinetic energy calculated in Equation 1 above may be changed depending on the implantation material and the metal material powder, and may be, for example, 1 µJ or more; 1 µJ to 10 mJ; 1 µJ to 5 mJ; or 1 µJ to 1 mJ.

As an example of the present disclosure, it may be possible to give a movement speed corresponding to the kinetic energy and control the momentum according to Equation 1 above, and for example, it may be possible to control the momentum of metal material powder and implantation material particles by applying reciprocating motion or the like by a rotational force and vibration according to Equation 1.

According to an example embodiment of the present disclosure, the preparation method may further include a step (S400) of calculating the kinetic energy according to Equation 1 above, and the step (S400) may be applied before, during, or before and during the step (S300) of forming the functional composite powder.

The present disclosure relates to a functional composite powder, and according to an example embodiment of the present disclosure, the functional composite powder may be prepared by the method for preparing the functional composite powder according to the present disclosure, and may be a spherical functional composite powder in which an implantation material layer is formed on the metal material particles.

According to an example embodiment of the present disclosure, the implantation material layer in the functional composite powder may contain a mechanical residual stress since it is prepared by the preparation method according to the present disclosure. Further, since the surface of the metal material region is deformed due to physical collision, a mechanical interlocking effect may be provided. Further, since it is possible to expand the material range to non-metallic materials as well as metallic materials, and various solid powder-type materials may be implanted into functional composite powder particles, various material degrees of freedom may be given.

For example, the introduction of the implantation material layer may provide the effect of securing high heat resistance and improving the function of the product with the oxide dispersion strengthening function, and may be used to control the physical properties and characteristics of the product, such as improving the mechanical properties and biocompatibility of the product. In addition, it is possible to provide materials and products that can be used in various application fields through control of the physical properties of printed products and addition or improvement of functions by providing, through surface alloying, metal 3D printing process-enabling alloy powders, microstructure control-enabling powders, etc.

Figure 3A:
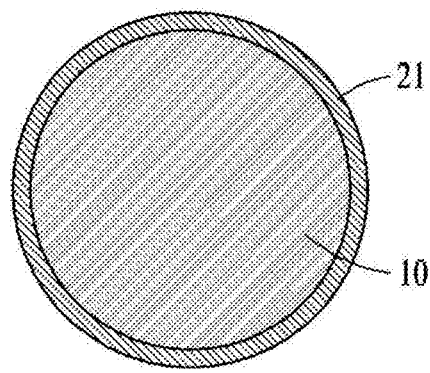
FIGS. 3A to 3C exemplarily show particle configurations of the functional composite powder according to the present disclosure, according to an example embodiment of the present disclosure.
Figure 3A:
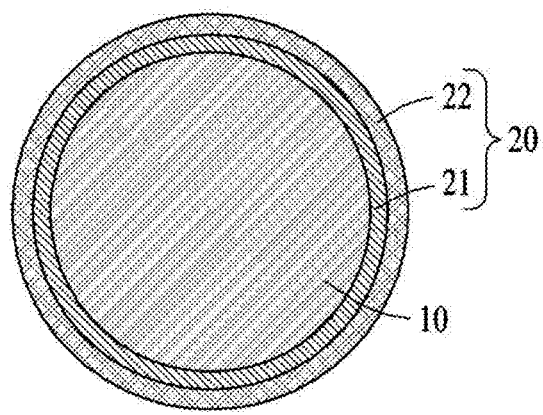
Figure 3A:
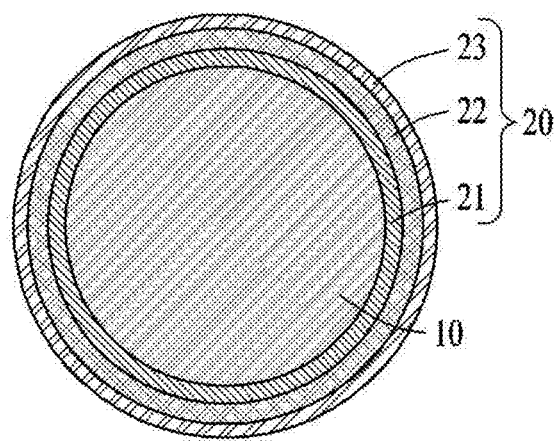

According to an example embodiment of the present disclosure, referring to FIG. 3A, the functional composite material may include a functional composite powder including a core of metal material particles 10 and an implantation material layer 20 coated on the metal material particles 10.

As an example of the present disclosure, the metal material particles 10 may be metal material particles spheroidized by the preparation method according to the present disclosure, and may correspond to the core on which the implantation material layer 20 is coated. As shown in FIG. 2, the surface of the metal material particles 10 is not smooth due to collision between the powders, and the surface is satellite- or bump-free, which may be advantageous in increasing the flowability of the functional composite powder.

As an example of the present disclosure, the implantation material layer 20 may include a single layer or a plurality of layers, the plurality of layers may be two or more layers 21 and 22; or three or more layers 21, 22, and 23, and the configuration of each layer may be the same or different. For example, components, thickness, or both thereof may be different. When it is composed of the plurality of layers, the thickness ratio of the first layer 21 in contact with the core to the remaining layers may be 1:1,000 to 10,000:1. When it is included within the above range, the dispersion of the implantation material may be well made, and it may be advantageous in forming the implantation material layer to a uniform thickness.

As an example of the present disclosure, at least a portion of the implantation material layer 20 may penetrate into the metal material particles 10, and 1 to 80%; 1 to 20%; 1 to 10%; or 1 to 5% of the total thickness of the implantation material layer 20 may penetrate.

As an example of the present disclosure, the implantation material layer 20 may have a thickness of: 0.01 to 20 μm; 0.1 to 15 μm; and preferably 0.01 to 13 μm. When it is included within the above range, it may be advantageous in realizing the functionality of the implantation material and securing the dispersibility of the powder.

As an example of the present disclosure, the implantation material layer 20 may be contained in an amount range of: 0.01 to 80% by volume; 0.1 to 70% by volume; 1 to 50% by volume; or 5 to 30% by volume of the total volume of the functional composite powder, and when it is included within the above range, it may be advantageous in realizing the functionality of the implantation material and securing the dispersibility of the powder.

As an example of the present disclosure, the implantation material layer 20 may be formed on the entire surface or at least a portion of the surface of the metal material particles 10 depending on the concentration (or content) of the implantation material, and for example, may form a dense shell layer surrounding the metal material particles or a dispersion layer that is distributed to a low density. Further, the implantation material layer 20 may contain a mechanical residual stress and may include a physically deformed microstructure and/or a porous structure.

As an example of the present disclosure, the dispersion layer may be one in which particles of an implantation material, a region containing the implantation material, or both thereof are dispersed and applied on the metal material particles 10, and a portion of the dispersion layer may penetrate into the inside of the metal material particles, the shell layer, or both thereof. For example, referring to (a) of FIG. 3B, the dispersion layer may be dispersed on the surface of the metal material particles 10, and at least a portion of the dispersed implantation material may penetrate into the metal material particles 10. Further, the particles of the implantation material or a plurality of regions containing the implantation material particles may be distributed.

As an example of the present disclosure, the dispersion layer may contain one or two or more types of implantation materials, the dispersion layer may be a single layer or a plurality of layers, and the configurations of the implantation materials of the respective layers may be the same or different. For example, the components, thickness, or both thereof of the implantation material may be different. The components of the implantation material are as mentioned in the preparation method.

As an example of the present disclosure, the dispersion layer may be formed at least one of on the metal material particles, in the shell layer, and on the shell layer. For example, it may be the dispersion layer 21 formed on the metal material particles in (b) of FIG. 3B, the dispersion layer 23 formed on the shell layer 22, or the form 21a in which the particles are three-dimensionally dispersed in the shell layer 21. The configuration of such a dispersion layer may be confirmed in the three-dimensional view of the functional composite powder of FIG. 3C.

As an example of the present disclosure, the shell layer is one in which the implantation material densely surrounds the metal material particles 10, and may be one in which the particles of the implantation material, the region containing the implantation material, or both thereof are densely coated or connected to form a network structure or matrix. For example, the shell layer may form a porous network structure or fine grains.

As an example of the present disclosure, the shell layer contains an implantation material surrounding the metal material particles, the dispersion layer, or both thereof, and may be a single layer or a plurality of layers. When it is a plurality of layers, configurations of the respective layers may be the same or different, and for example, at least one of the components, thickness, and microstructure may be different. For example, a laminated microstructure (porous structure and fine grains) may be formed when the plurality of layers is formed.

Figure 3B:
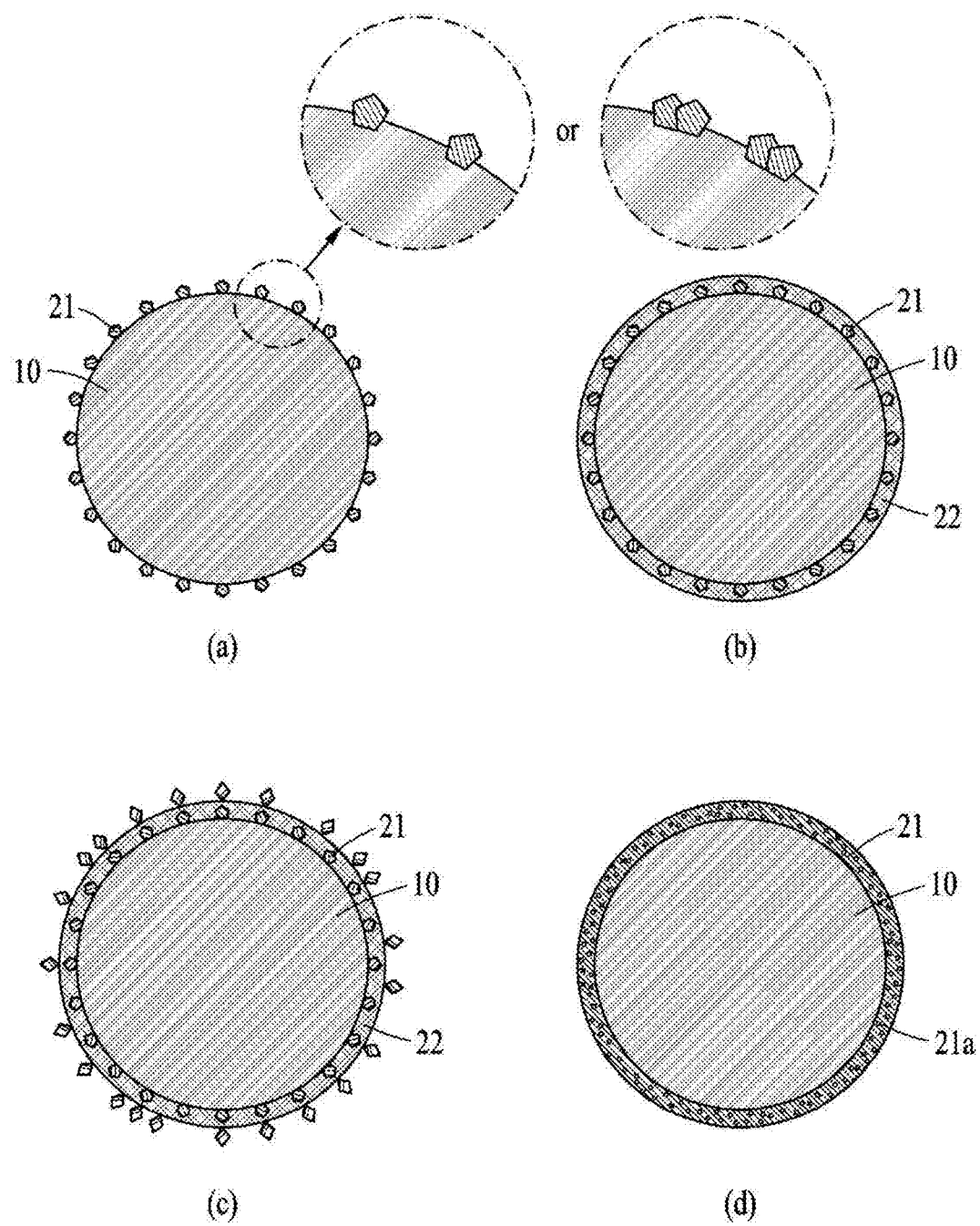
Figure 3C:
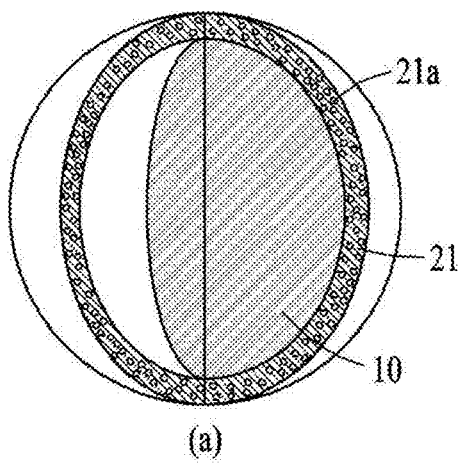
Figure 3C:
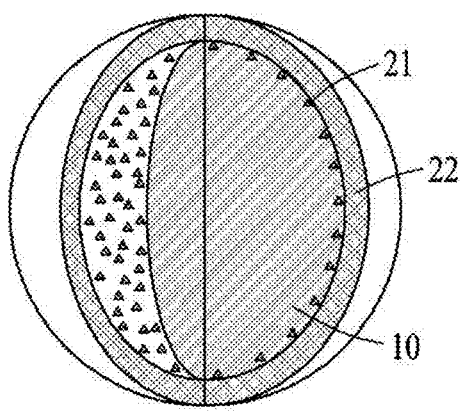
Figure 3C:
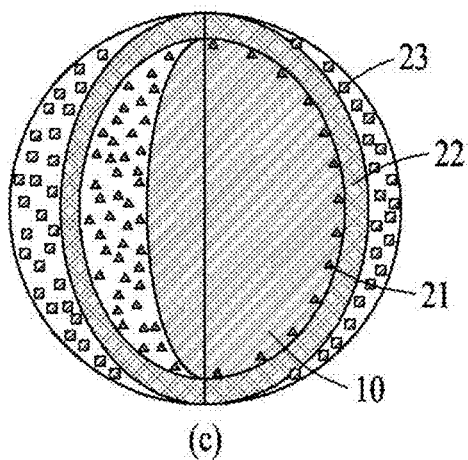

That is, referring to FIGS. 3B to 3C, the shell layer may be formed as a protective layer surrounding a metal material core 10 or surrounding a dispersion layer formed on the metal material core 10. The shell layer may contain the implantation material according to the present disclosure, and the shell layer may include a region penetrated from the surface to the inside of the core. Further, the implantation material may be further dispersed in the shell layer, the implantation material may be dispersed in the shell layer as well as the surface of the metal material particles to achieve three-dimensional dispersion rather than two-dimensional dispersion, and the anti-aggregation effect and adhesive strength of the implantation material may be improved to lower the loss rate of the implantation material. For example, the high dispersion of the powder and the loss rate of the implantation material may be lowered without a change in the process conditions during the metal 3D printing process.

As an example of the present disclosure, the surface of the shell layer may be satellite- or bump-free, which may be advantageous in increasing the flowability of the functional composite powder.

As an example of the present disclosure, the shell layer may contain a porous structure or fine grains, and the fine grains may be grains of sub-micrometer unit. For example, they may be grains having a size of 50 nm to 2 μm.

As an example of the present disclosure, the shell layer may contain one or two or more types of implantation materials, and the shell layer may contain a first implantation material that is a base material of the shell layer, and may further contain a second implantation material that is dispersed in a matrix of the first implantation material. For example, it may contain second implantation material particles three-dimensionally dispersed in the shell layer in FIGS. 3B and 3C. That is, the implantation material is three-dimensionally dispersed inside the shell layer so that it may be advantageous to secure a high degree of dispersibility, prevent loss of the implantation material, and achieve spheroidization on the surface of the non-spherical powder.

In the functional composite powder of the present disclosure, for example, the implantation material layer 20 formed on the spheroidized metal material particles 10 may be composed of the above-mentioned dispersion layer, the shell layer, or a combination thereof.

For example, the implantation material layer 20 may include: a first dispersion layer 21 formed on the spheroidized metal material particles 10; and a first shell layer 22 that is a protective layer surrounding the first dispersion layer, and further include a second dispersion layer 23 or a second shell layer 23 formed on the first shell layer 22. A portion of the first dispersion layer 21 and/or the second dispersion layer 23 may at least partially penetrate into a lower layer, for example, the inside of the metal material particles 10 or the shell layer 22. The first shell layer 22 and the second shell layer 23 may be each a single layer or a plurality of layers. The first dispersion layer and/or the second dispersion layer may be a single layer or a plurality of layers.

For example, the functional composite powder may include: a first shell layer 21 formed on the metal material particles 10; and a second shell layer 22 that is formed on the first shell layer 21 and surrounds the first shell layer 21, and may further include a third shell layer 23 surrounding the second shell layer 22 or a dispersion layer 23 formed on the second shell layer 22. The first shell layer 21, the second shell layer 22, and the third shell layer 23 may be each a single layer or a plurality of layers, and the dispersion layer 23 may be a single layer or a plurality of layers.

According to an example embodiment of the present disclosure, the components of the spheroidized metal material powder and the implantation material layer are as mentioned in the preparation method.

According to an example embodiment of the present disclosure, the functional composite powder may have a size of: 1 μm or less; or 1 μm or more, e.g., 1 nm to 1 μm; 100 to 900 nm; 10 μm or more; 1 to 200 μm; or 10 to 200 μm, and when it is included within the above range, a powder that has good dispersibility and flowability and is suitable for metal 3D printing process and functionality implementation may be obtained.

According to an example embodiment of the present disclosure, the functional composite powder may be for metal 3D printing, and provide a product prepared by metal 3D printing. The product may be parts, materials, devices, etc. in various fields such as aviation, automobiles, electronic devices, and biotransplantation materials. As an example of the present disclosure, a functional product produced by the 3D printing process with a metal 3D printing composition may be, for example, a Ni-based 3D printing aviation part, a Ti-based biotransplantation material, a 3D printing alloy, a functional powder product for controlling physical properties of 3D printing products, and the like. For example, a product produced by performing 3D printing may provide excellent mechanical properties, abrasion resistance, biocompatibility, fatigue properties, etc. compared to existing alloys.

The present disclosure relates to a method for metal 3D printing using the functional composite powder according to the present disclosure, and according to an example embodiment of the present disclosure, it may include the steps of: preparing the functional composite powder according to the present disclosure; injecting the functional composite powder into a 3D printing device; and performing 3D printing. The 3D printing device and 3D printing process may use devices and processes known in the art of the present disclosure, and are not specifically mentioned.

As described above, although the example embodiments have been described by limited example embodiments and drawings, those with ordinary skill in the art may apply various modifications and alterations from the above-mentioned description. For example, appropriate results can be achieved although described techniques are carried out in a different order from a described method, and/or described elements are combined or mixed in a different form from the described method, or replaced or substituted with other elements or equivalents. Therefore, other embodiments, other example embodiments, and equivalents to patent claims belong to the scope of the patent claims to be described later.

What is claimed is:

1. A spherical functional composite powder in which an implantation material layer is formed on metal material particles, the implantation material layer includes a dispersion layer of an implantation material, a shell layer, or both thereof, and the implantation material layer contains a mechanical residual stress, wherein the functional composite powder has a size of 10 to 200 μm, the metal material particles are spheroidized metal material particles, and a surface of the spheroidized metal material particles is satellite-free; and wherein at least a portion of the implantation material layer penetrates into the metal material particles at 1 to 80% of the total thickness of the implantation material.

2. The functional composite powder of claim 1, wherein the implantation material layer includes a single layer or a plurality of layers, the implantation material layer has a thickness of 0.01 to 15 μm.

3. The functional composite powder of claim 1, wherein the dispersion layer contains one or two or more types of the implantation materials, the dispersion layer contains the implantation material dispersed and applied on the metal material particles, the shell layer, or both thereof, the dispersion layer is a single layer or a plurality of layers, and a portion of the dispersion layer penetrates into an inside of the metal material particles, the shell layer, or both thereof.

4. The functional composite powder of claim 1, wherein the shell layer contains the implantation material surrounding the metal material particles, the dispersion layer, or both thereof, the shell layer is a single layer or a plurality of layers, and the plurality of layers is the same, or is different in components, thickness, or both thereof.

5. The functional composite powder of claim 1, wherein a surface of the shell layer is satellite-free.

6. The functional composite powder of claim 1, wherein the shell layer contains fine grains, and the fine grains are grains of sub-micrometer unit.

7. The functional composite powder of claim 1, wherein the shell layer contains one or two or more types of the implantation materials, and the shell layer contains a first implantation material that is a base material of the shell layer, and further contains a second implantation material dispersed within a matrix of the first implantation material.

8. The functional composite powder of claim 1, wherein the implantation material layer includes: a first dispersion layer formed on the metal material particles; and a shell layer surrounding the first dispersion layer, and further includes a second dispersion layer formed on the shell layer, and a portion of the first dispersion layer penetrates into an inside of the metal material particles.

9. The functional composite powder of claim 1, wherein the implantation material layer includes: a first shell layer formed on the metal material particles; and a second shell layer which is formed on the first shell layer and surrounds the first shell layer, and further includes a dispersion layer formed on the first shell layer, the second shell layer, or both thereof.

* * * * *